(12) United States Patent
Matsumura et al.

(10) Patent No.: US 9,122,048 B2
(45) Date of Patent: Sep. 1, 2015

(54) IMAGE PROCESSING APPARATUS AND IMAGE PROCESSING PROGRAM

(75) Inventors: Shingo Matsumura, Osaka (JP); Woobum Kang, Osaka (JP)

(73) Assignee: Keyence Corporation, Osaka (JP)

( * ) Notice: Subject to any disclaimer, the term of this patent is extended or adjusted under 35 U.S.C. 154(b) by 263 days.

(21) Appl. No.: 13/559,749

(22) Filed: Jul. 27, 2012

(65) Prior Publication Data

US 2013/0100170 A1    Apr. 25, 2013

(30) Foreign Application Priority Data

Oct. 19, 2011   (JP) .................................. 2011-230079

(51) Int. Cl.
| | | |
|---|---|---|
| *G09G 5/00* | (2006.01) | |
| *G02B 21/00* | (2006.01) | |
| *G01B 11/02* | (2006.01) | |
| *G01B 11/08* | (2006.01) | |
| *G01B 11/24* | (2006.01) | |
| *G02B 21/36* | (2006.01) | |
| *G06T 7/60* | (2006.01) | |

(52) U.S. Cl.
CPC .......... *G02B 21/0016* (2013.01); *G01B 11/024* (2013.01); *G01B 11/08* (2013.01); *G01B 11/24* (2013.01); *G02B 21/365* (2013.01); *G06T 7/602* (2013.01); *G06T 2207/10056* (2013.01); *G06T 2207/30141* (2013.01)

(58) Field of Classification Search
CPC ............................. G06F 3/0485; G06T 11/00
USPC ........................................................ 345/672
See application file for complete search history.

(56) References Cited

U.S. PATENT DOCUMENTS

| | | | |
|---|---|---|---|
| 7,308,128 B2 | 12/2007 | Inomata | |
| 2001/0040995 A1* | 11/2001 | Takada et al. ................. | 382/152 |
| 2006/0088201 A1* | 4/2006 | Delaney ........................ | 382/152 |
| 2008/0297596 A1 | 12/2008 | Inomata et al. | |
| 2008/0297597 A1 | 12/2008 | Inomata et al. | |
| 2010/0060903 A1 | 3/2010 | Nakatsukasa et al. | |
| 2010/0149362 A1 | 6/2010 | Kang | |
| 2010/0149363 A1 | 6/2010 | Inomata et al. | |
| 2010/0149364 A1 | 6/2010 | Kang | |
| 2010/0189308 A1 | 7/2010 | Nakatsukasa | |
| 2011/0074817 A1* | 3/2011 | Shinoda et al. ............... | 345/634 |

(Continued)

FOREIGN PATENT DOCUMENTS

| | | |
|---|---|---|
| JP | 2004-177325 | 6/2004 |
| JP | 2004-177782 | 6/2004 |

(Continued)

*Primary Examiner* — Devona Faulk
*Assistant Examiner* — Jin Ge
(74) *Attorney, Agent, or Firm* — Kilyk & Bowersox, P.L.L.C

(57) ABSTRACT

Provided is an image processing apparatus and an image processing program which are capable of selectively and readily acquiring a geometrical physical quantity of a desired measuring portion. An object image is displayed based on object image data, and a measuring portion designating image corresponding to a specific portion of the object image is displayed based on designating image data. By operation of an operation part by a user, the displayed measuring portion designating image is moved relatively to the object image. When the measuring portion designating image is moved to a specific portion of the object image, a geometrical physical quantity of a measuring portion of the measuring object, previously set so as to correspond to that specific portion, is measured.

6 Claims, 16 Drawing Sheets

(56) References Cited

U.S. PATENT DOCUMENTS

| | | |
|---|---|---|
| 2012/0001069 A1 | 1/2012 | Kashihara |
| 2012/0001070 A1 | 1/2012 | Takagi |
| 2012/0008848 A1* | 1/2012 | Beck .......................... 382/132 |
| 2012/0027289 A1 | 2/2012 | Naruse et al. |
| 2012/0027307 A1 | 2/2012 | Naruse |
| 2012/0106788 A1 | 5/2012 | Inomata |

FOREIGN PATENT DOCUMENTS

| | | |
|---|---|---|
| JP | 2004-239890 | 8/2004 |
| JP | 2009-300125 | 12/2009 |
| JP | 2010-032331 | 2/2010 |
| JP | 2010-032471 | 2/2010 |
| JP | 2010-060528 | 3/2010 |
| JP | 2010-169584 | 8/2010 |

* cited by examiner

MEASURING PORTION DESIGNATING IMAGE AI

MEASURING PORTION DESIGNATING IMAGE AI

IMAGE PROCESSING APPARATUS AND IMAGE PROCESSING PROGRAM

CROSS-REFERENCE TO RELATED APPLICATIONS

The present application claims foreign priority based on Japanese Patent Application No. 2011-230079, filed Oct. 19, 2011, the contents of which is incorporated herein by reference.

BACKGROUND OF THE INVENTION

1. Field of the Invention

The present invention relates to an image processing apparatus and an image processing program for processing images.

2. Description of Related Art

Conventionally, a physical quantity of a measuring object has been measured from an image of the measuring object by use of an image processing apparatus. In an image measuring apparatus described in Japanese Unexamined Patent Publication No. 2010-169584, an image of a measuring object is displayed based on acquired image data. On that image, a characteristic image showing a characteristic portion and a measuring position are designated. The designated characteristic image, a relative position of a measuring position with respect to the characteristic image, and the like are stored into a storage part.

Thereafter, an image of the measuring object is displayed based on new image data. From that image, a partial image agreeing with the characteristic image stored in the storage part is searched by a matching process. A measuring position is set based on the searched partial image and the relative position stored in the storage part, and an edge portion of the set measuring position is detected. A predetermined physical quantity is measured based on the detected edge portion.

In the above image measuring apparatus, when a plurality of partial images agreeing with the characteristic image are present in the image of the measuring object, measuring positions are set with respect to all the partial images, to measure physical quantities. For this reason, a place not required to be measured may be measured. On the other hand, it is also considered that the setting for measurement is individually performed only on places required to be measured on the image of the measuring object. However, when the number of measuring places increases, great effort is required for performing the setting for measurement on all the measuring places.

SUMMARY OF THE INVENTION

It is an object of the present invention, to provide an image processing apparatus and an image processing program which are capable of selectively and readily acquiring a geometrical physical quantity of a desired measuring portion.

(1) An image processing apparatus according to one embodiment of the present invention includes: a display part that displays an image of a measuring object as an object image based on first image data, and displays a measuring portion designating image corresponding to a specific portion of the object image based on second image data; a storage part that stores a preset positional relation between the measuring portion designating image and a detecting region for detecting a predetermined characteristic portion from the object image; and a process part that manually moves the measuring portion designating image relatively to the object image, detects the characteristic portion in the object image from the detecting region having the positional relation stored in the storage part with respect to the measuring portion designating image after movement when the measuring portion designating image is moved to the specific portion of the object image, and calculates a geometrical physical quantity concerning the detected characteristic portion based on the first image data.

In the image processing apparatus, the positional relation between the measuring portion designating image and the detecting region for detecting the predetermined characteristic portion from the object image is stored into the storage part. The image of the measuring object is displayed as the object image in the display part based on the first image data, and the measuring portion designating image corresponding to the specific portion of the object image is displayed in the display part based on the second image data. By the operation part being operated by the user, the measuring portion designating image is moved relatively to the object image. When the measuring portion designating image is moved to the specific portion of the object image, the predetermined characteristic portion of the object image is detected from the detecting region having the positional relation stored in the storage part with respect to the measuring portion designating image after the movement. The geometrical physical quantity concerning the detected characteristic portion is calculated based on the first image data.

Accordingly, even when a plurality of specific portions are present in the object image, the user can move the measuring portion designating image to a desired specific portion of the object image by operation of the operation part, to thereby acquire the geometrical physical quantity concerning the characteristic portion having the positional relation with respect to the specific portion. It is therefore possible to selectively and readily acquire the geometrical physical quantity of the desired measuring portion of the measuring object.

(2) The geometrical physical quantity may include at least one of a length and an angle. In this case, the user can move the measuring portion designating image to the specific portion of the object image by operation of the operation part, to thereby acquire at least one of the length and the angle of the portion having the positional relation with respect to the specific portion.

(3) The measuring portion designating image may include a specific portion of an image of a measuring object which is identical or similar to the measuring object.

In this case, since the measuring portion designating image is substantially identical or similar to the specific portion of the object image, the relation between the measuring portion designating image and the specific portion of the object image can be readily recognized by the user. This allows the user to readily move the measuring portion designating image to the desired specific portion.

(4) The process part may be operated so as to control an imaging unit such that the first image data is acquired on a common imaging condition with a condition at the time of acquiring the second image data.

In this case, the correlation between the measuring portion designating image and the specific portion of the object image becomes higher. This allows the user to more readily move the measuring portion designating image to the desired specific portion of the object image.

(5) The process part may be operated such that, when the first image data is acquired at a first imaging magnification and the second image data is acquired at a second imaging magnification, the object image or the measuring portion designating image is reduced or enlarged based on a ratio between the first imaging magnification and the second imaging magnification.

In this case, the measuring portion designating image and the specific portion of the object image can be displayed with the same dimensions in the display part. This allows the user to more readily move the measuring portion designating image to the desired specific portion of the object image.

(6) The measuring portion designating image may include a diagram corresponding to the specific portion of the object image.

In this case, a process load for generating and displaying the measuring portion designating image is reduced. This enables reduction in cost.

(7) The process part may be operated such that, when a distance between the measuring portion designating image and the specific portion of the object image falls within a range by operation of the operation part, the measuring portion designating image is moved so as to make a position of the measuring portion designating image agree with a position of the specific portion of the object image.

In this case, it is possible to readily and accurately make the position of the measuring portion designating image agree with the position of the specific portion of the object image. It is thereby possible to readily and accurately acquire the geometrical physical quantity concerning the portion having the positional relation with respect to the specific portion.

(8) An image processing apparatus according to another embodiment of the present invention includes: a process for displaying an image of a measuring object as an object image based on first image data, and displaying a measuring portion designating image corresponding to a specific portion of the object image based on second image data; a process for previously storing a preset positional relation between the measuring portion designating image and a detecting region for detecting a predetermined characteristic portion from the object image; a process operated by a user for moving the displayed measuring portion designating image relatively to the object image; and a process for detecting the characteristic portion in the object image from the detecting region having the stored positional relation with respect to the measuring portion designating image after movement when the measuring portion designating image is moved to the specific portion of the object image by operation by the user, and calculating a geometrical physical quantity concerning the detected characteristic portion based on the first image data.

According to the image processing program, the preset positional relation between the measuring portion designating image and the detecting region for detecting a predetermined characteristic portion from the object image is previously stored. The image of the measuring object is displayed as the object image based on the first image data, and the measuring portion designating image corresponding to the specific portion of the object image is displayed based on the second image data. By operation of the user, the measuring portion designating image is moved relatively to the object image. When the measuring portion designating image is moved to the specific portion of the object image, the predetermined characteristic portion of the object image is detected from the detecting region having the previously stored positional relation with respect to the measuring portion designating image after the movement. The geometrical physical quantity concerning the detected characteristic portion is calculated based on the first image data.

Accordingly, even when a plurality of specific portions are present in the object image, the user can move the measuring portion designating image to a desired specific portion by operation of the operation part, to thereby acquire the geometrical physical quantity concerning the portion having the positional relation with respect to the specific portion. It is therefore possible to selectively and readily acquire the geometrical physical quantity of the desired measuring portion of the measuring object.

According to the present invention, it is possible to selectively and readily acquire a geometrical physical quantity of a desired measuring portion.

DETAILED DESCRIPTION OF PREFERRED EMBODIMENTS

Hereinafter, a magnification observation device provided with an image processing apparatus according to one embodiment of the present invention will be described with reference to the drawings.

(1) Configuration of Magnification Observation Device

Figure 1:
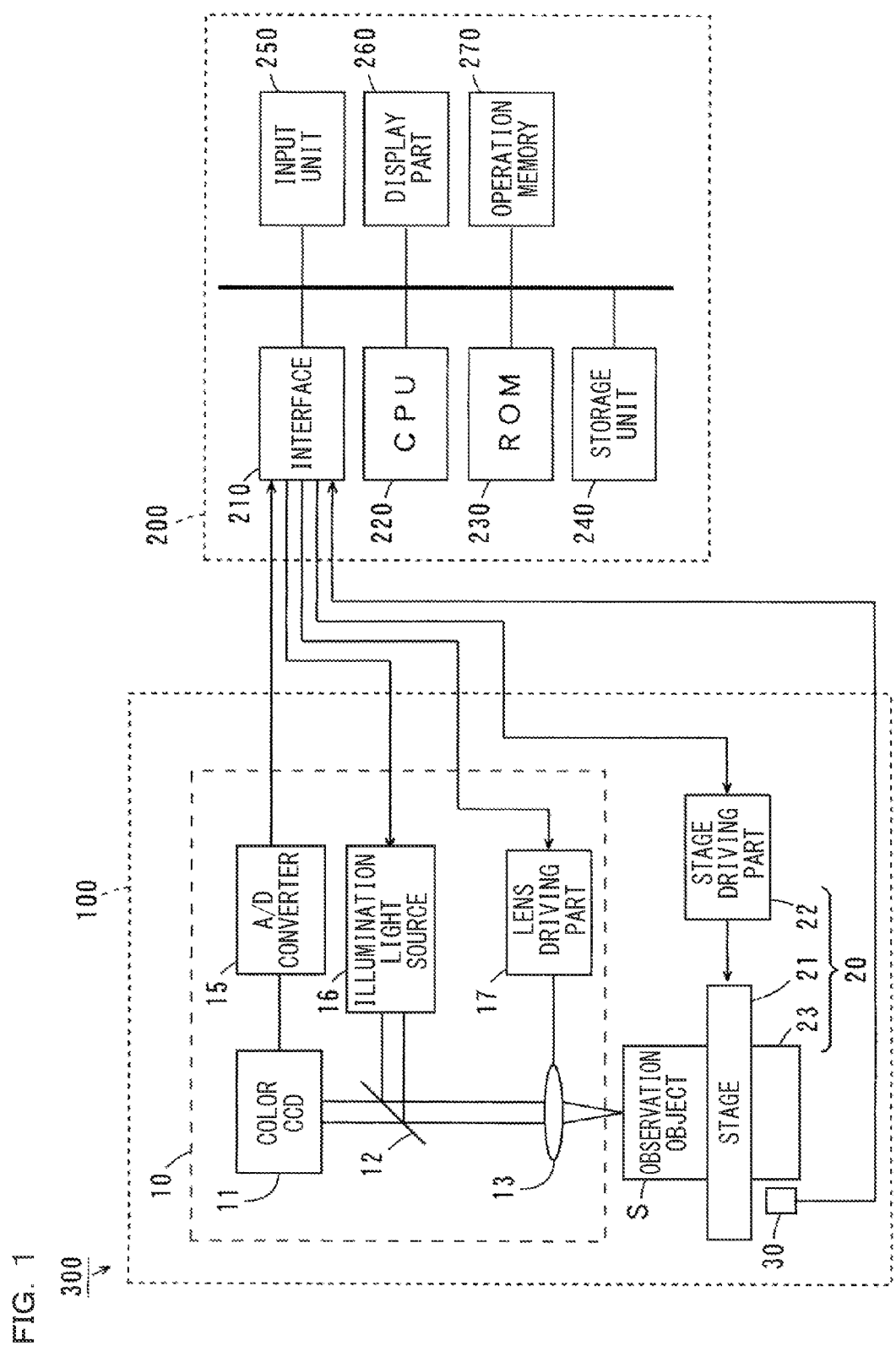
FIG. 1 is a block diagram showing a configuration of a magnification observation device provided with an image processing apparatus according to one embodiment of the present invention.

FIG. 1 is a block diagram showing a configuration of a magnification observation device provided with an image processing apparatus according to one embodiment of the present invention.

Hereinafter, two directions orthogonal within a horizontal plane are taken as an X-direction and a Y-direction, and a vertical direction (perpendicular direction) to the X-direction and the Y-direction is taken as a Z-direction.

As shown in FIG. 1, a magnification observation device 300 is provided with a microscope 100 and an image processing apparatus 200.

The microscope 100 includes an imaging unit 10, a stage unit 20, and a rotational angle sensor 30. The imaging unit 10 includes a color CCD (charge coupled device) 11, a half mirror 12, an object lens 13, an A/D converter (analog/digital converter) 15, an illumination light source 16, and a lens driving part 17. The stage unit 20 includes a stage 21, a stage driving part 22 and a stage supporting part 23. A measuring object S is mounted on the stage 21.

The illumination light source 16 is, for example, a halogen lamp or a white LED (light-emitting diode) which generates white light. White light generated by the illumination light source 16 is reflected by the half mirror 12, and thereafter collected by the object lens 13 onto the measuring object S on the stage 21.

The white light reflected by the measuring object S is incident on the color CCD 11 through the object lens 13 and the half mirror 12. The color CCD 11 has a plurality of pixels for red that receive red wavelength light, a plurality of pixels for green that receive green wavelength light, and a plurality of pixels for blue that receive blue wavelength light. The plurality of pixels for red, the plurality of pixels for green, and the plurality of pixels for blue are two-dimensionally arrayed. From each of the pixels in the color CCD 11, an electric signal corresponding to a light receiving amount is outputted. The output signal of the color CCD 11 is converted to a digital signal by the A/D converter 15. The digital signal outputted from the A/D converter 15 is sequentially provided as image data to the image processing apparatus 200. Instead of the color CCD 11, an imaging element such as a CMOS (complementary metal oxide semiconductor) image sensor may be used.

The object lens 13 is provided movably in the Z-direction. The lens driving part 17 moves the object lens 13 in the Z-direction by control of the image processing apparatus 200. Thereby, a focal position of the imaging unit 10 moves in the Z-direction.

The stage 21 is rotatably provided on the stage supporting part 23 around an axis in the Z direction. The stage driving part 22 moves the stage 21 in an x-direction and a y-direction, described later, relatively with respect to the stage supporting part 23 based on a movement command signal (drive pulse) provided from the image processing apparatus 200. The stage driving part 22 uses a stepping motor. The rotational angle sensor 30 detects a rotational angle of the stage 21, and provides the image processing apparatus 200 with an angle detection signal indicating the detected angle.

The image processing apparatus 200 includes an interface 210, a CPU (central processing unit) 220, a ROM (read only memory) 230, a storage unit 240, an input unit 250, a display part 260, and an operation memory 270.

A system program is stored into the ROM 230. The storage unit 240 is made up of a hard disk and the like. An image processing program is stored into the storage unit 240. The image processing program includes a designating information setting process program and a measuring process program, to be described later. Further, image data provided from the microscope 100 through the interface 210 and a variety of data such as later-mentioned designating information are stored into the storage unit 240. The input unit 250 includes a keyboard and a pointing device. As the pointing device, a mouse, a joystick, or the like is used.

The display part 260 is configured, for example, by a liquid crystal display panel or an organic EL (electroluminescent) panel.

The operation memory 270 is made up of a RAM (random access memory), and used for processing a variety of data.

The CPU 220 executes the image processing program stored in the storage unit 240, to perform image processing based on image data by means of the operation memory 270, and also displays an image based on the image data in the display part 260. Further, the CPU 220 controls the color CCD 11, the illumination light source 16, the lens driving part 17, and the stage driving part 22 of the microscope 100 through the interface 210.

Figure 2:
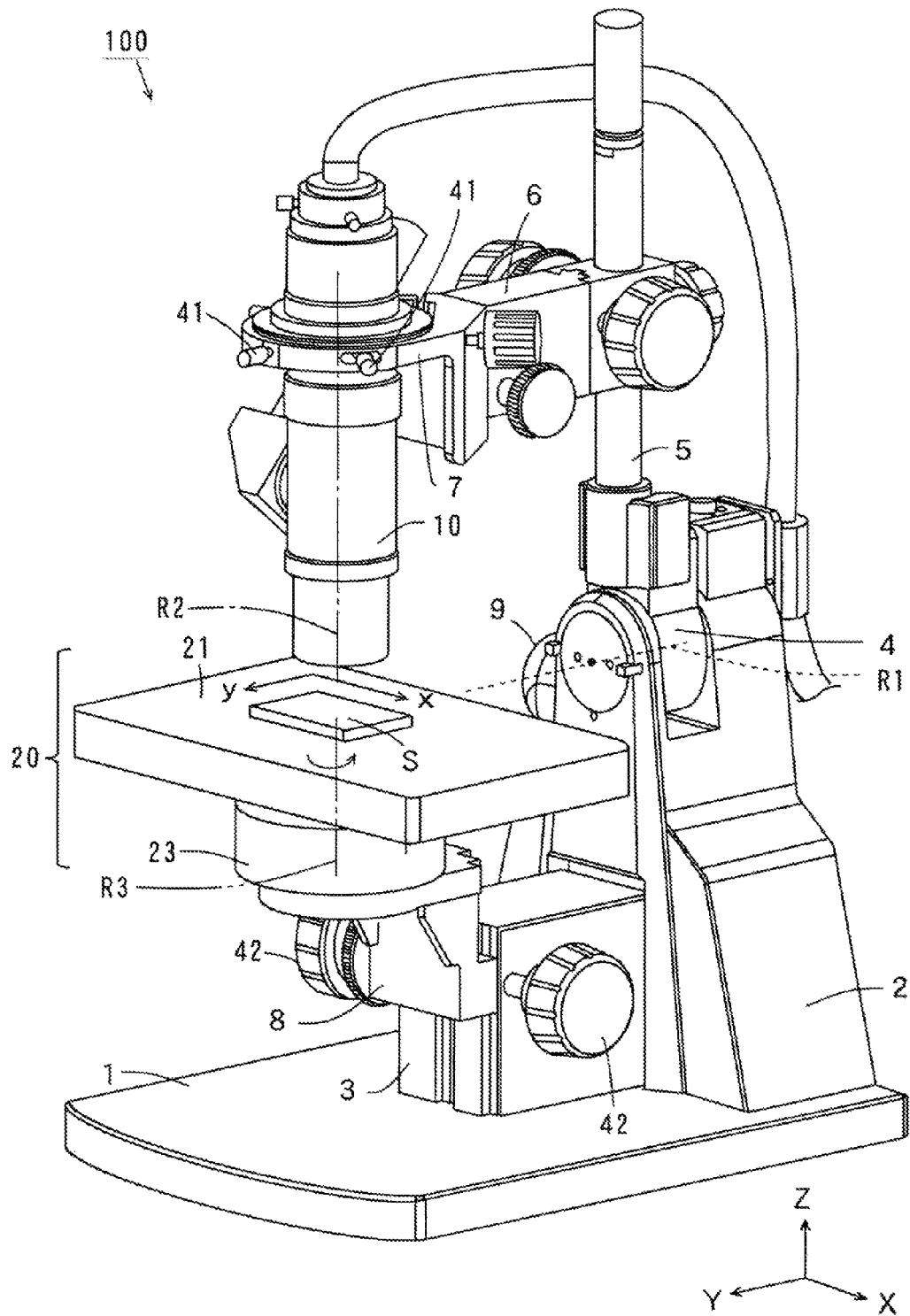
FIG. 2 is a perspective view showing a microscope of the magnification observation device according to one embodiment of the present invention.

FIG. 2 is a perspective view showing the microscope 100 of the magnification observation device 300 according to one embodiment of the present invention. In FIG. 2, the X-direction, the Y-direction, and the Z-direction are indicated by arrows.

As shown in FIG. 2, the microscope 100 has a base 1. A first supporting base 2 is attached onto the base 1, and a second supporting base 3 is also attached to the front surface of the first supporting base 2 so as to be embedded thereinto.

A connecting part 4 is rotatably attached to the top edge of the first supporting base 2 around a rotational axis R1 extending in the Y-direction. A rotational column 5 is attached to the connecting part 4. Thereby, the rotational column 5 is inclinable within a vertical plane parallel to the Z-direction with the rotational axis R1 taken as a fulcrum point in association with rotation of the connecting part 4. The user can fix the connecting part 4 to the first supporting base 2 by means of a fixing knob 9.

A circular supporting part 7 is attached to the front surface of a connecting part 6. A substantially tubular imaging unit 10 is attached to the supporting part 7. In the state of FIG. 2, a light axis R2 of the imaging unit 10 is parallel to the Z-direction. The supporting part 7 has a plurality of adjustment screws 41 for moving the imaging unit 10 within a horizontal plane. It is possible to adjust a position of the imaging unit 10 such that the light axis R2 of the imaging unit 10 vertically intersects with a rotational axis R1 by means of the plurality of adjustment screws 41.

A slider 8 is attached, slidably in the Z-direction, to the front surface of the second supporting base 3 on the base 1. An adjustment knob 42 is provided on the side surface of the second supporting base 3. A position of the slider 8 in the Z-direction (height direction) is adjustable by an adjustment knob 42.

The supporting part 23 of the stage unit 20 is attached onto the slider 8. The stage 21 is rotationally provided around a rotational axis R3 in the Z-direction with respect to the supporting part 23. Further, the x-direction and the y-direction intersecting with each other within the horizontal plane are set on the stage 21. The stage 21 is provided movably in the x-direction and the y-direction by the stage driving part 22 of FIG. 1. When the stage 21 rotates around the rotational axis R3, the x-direction and the y-direction of the stage 21 also rotate. This leads to inclination of the x-direction and the y-direction of the stage 21 within a horizontal plane with respect to the X-direction and the Y-direction.

An imaging range (visual field range) of the imaging unit 10 varies depending on a magnification of the imaging unit 10. Hereinafter, the imaging range of the imaging unit 10 is referred to as a unit region. The stage 21 can be moved in the x-direction and the y-direction, to thereby acquire image data of a plurality of unit regions. The image data of the plurality of unit regions can be connected, to thereby display images of the plurality of unit regions in the display part 260 of FIG. 1.

Figure 3:
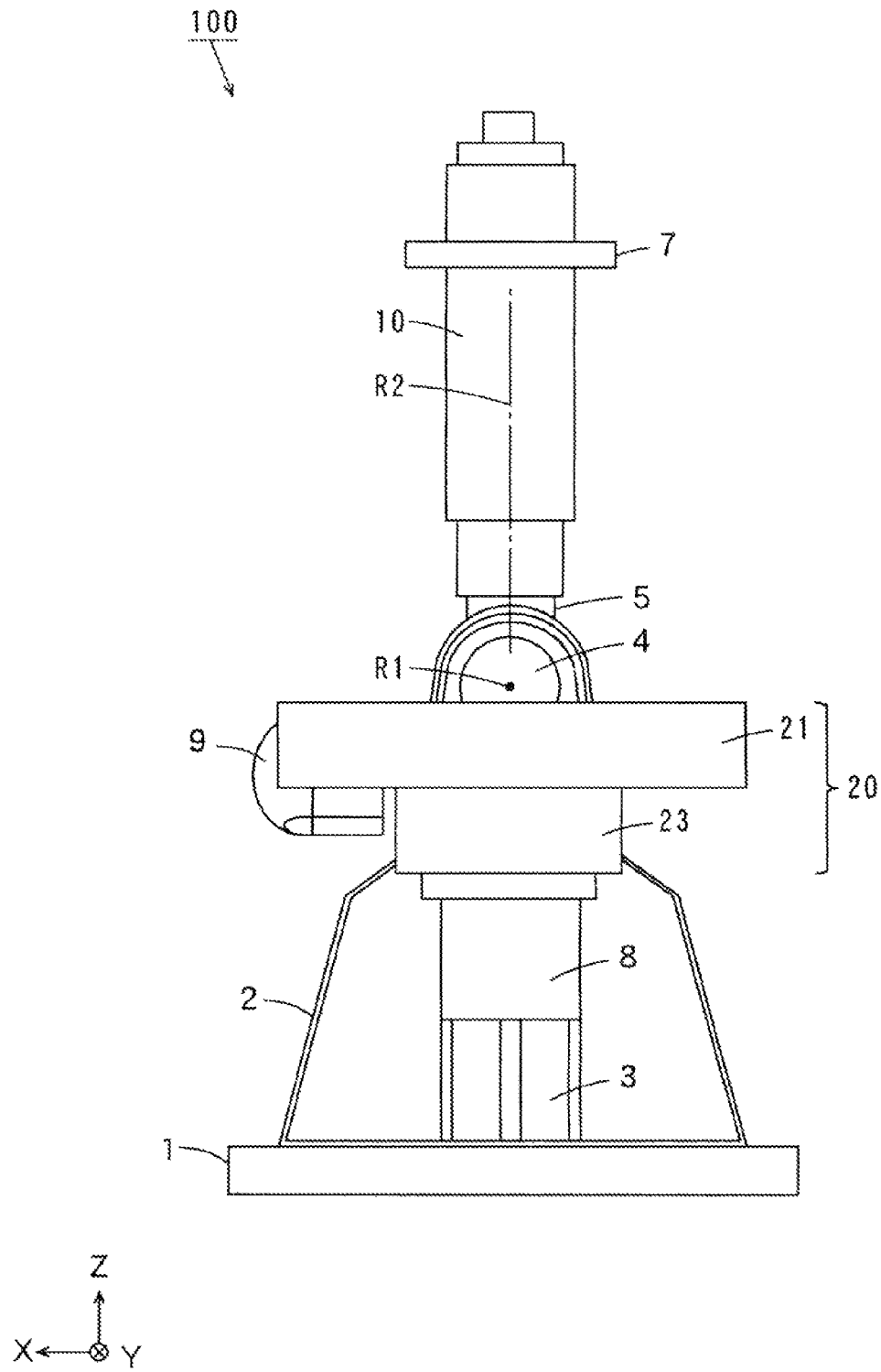
FIG. 3 is a schematic view showing a state where an imaging unit of the microscope is fixed parallel to a Z-direction.
Figure 4:
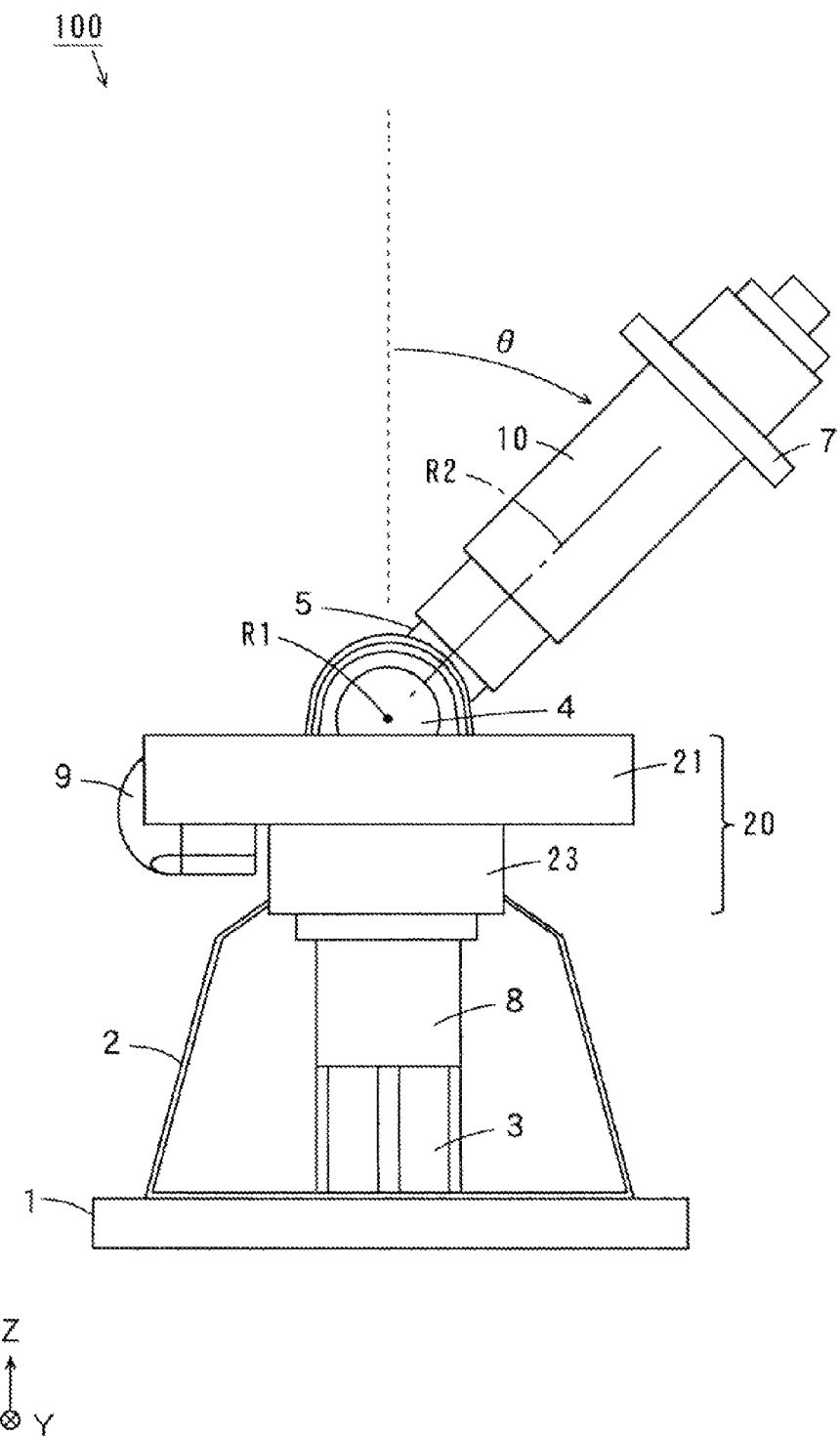
FIG. 4 is a schematic view showing a state where the imaging unit of the microscope is inclined at a desired angle from the Z-direction.

FIG. 3 is a schematic view showing a state where the imaging unit 10 of the microscope 100 is fixed parallel to the Z-direction. Further, FIG. 4 is a schematic view showing a state where the imaging unit 10 of the microscope 100 is inclined at a desired angle from the Z direction.

As shown in FIG. 3, with the rotational column 5 in a parallel state to the Z-direction, the fixing knob 9 is fastened, to fix the connecting part 4 to the second supporting base 3. Thereby, the light axis R2 of the imaging unit 10 vertically intersects with the rotational axis R1 while being in a parallel state to the Z-direction. In this case, the light axis R2 of the imaging unit 10 is vertical to the surface of the stage 21.

The fixing knob 9 is loosened, to make the connecting part 4 rotatable around the rotational axis R1, and the rotational column 5 inclinable with the rotational axis R1 taken as a fulcrum point. Therefore, as shown in FIG. 4, the light axis R2 of the imaging unit 10 is inclinable at an arbitrary angle θ with respect to the Z-direction. In this case, the light axis R2 of the imaging unit 10 vertically intersects with the rotational axis R1. Similarly, the light axis R2 of the imaging unit 10 is inclinable at an arbitrary angle on the side opposite to the side in FIG. 4 with respect to the Z-direction.

Therefore, a height of a surface of a measuring object on the stage 21 can be made to agree with a height of the rotational axis R1 by use of the adjustment knob 42 (FIG. 2), to thereby observe the same portion of the measuring object in a vertical direction and an oblique direction.

(2) Measurement of Measuring Portion of Measuring Object

As described above, based on image data of the measuring object S acquired by the imaging unit 10, an image of the measuring object S is displayed in the display part 260. Hereinafter, image data of the measuring object S is referred to as object image data, and an image of the measuring object S is referred to as an object image.

Figure 5:
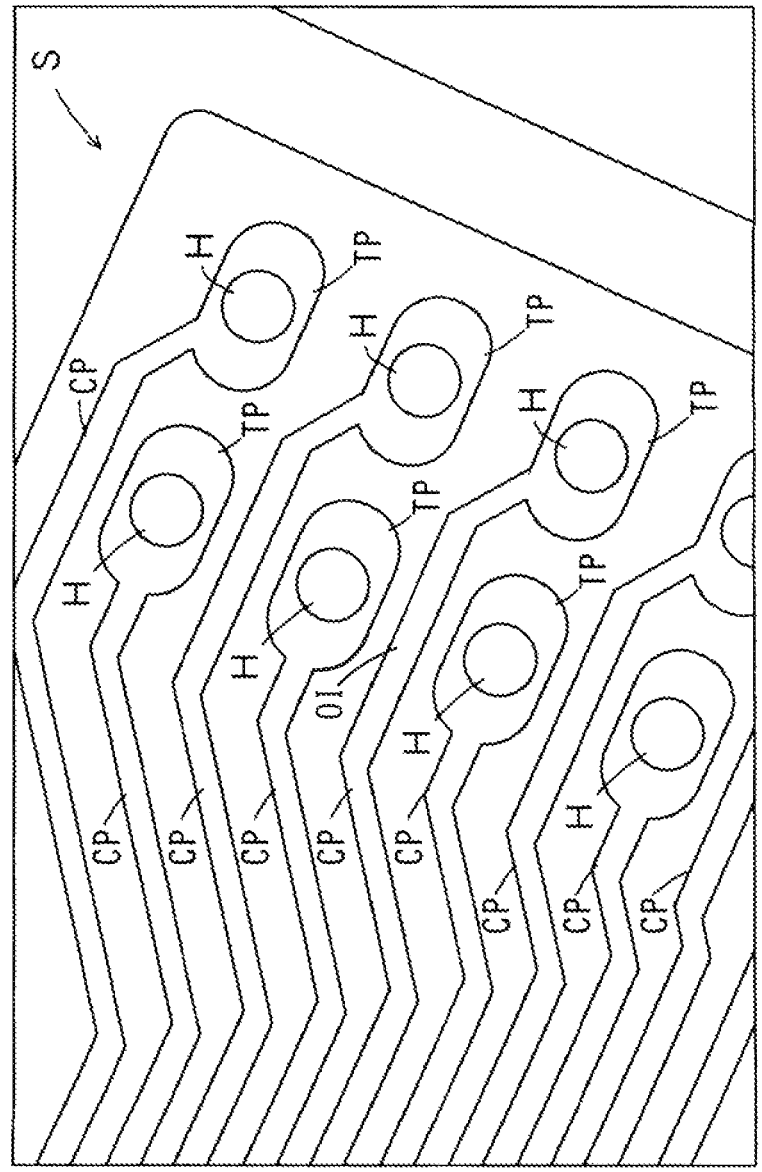
FIG. 5 is a view showing an example of an object image.

FIG. 5 is a view showing an example of the object image. In an object image OI of FIG. 5, the measuring object S is a circuit substrate including a plurality of terminal parts TP and a plurality of conductor patterns CP. Each terminal part TP is formed with a circular opening H.

In the present embodiment, designating information for designating a measuring portion of the measuring object S is stored into the storage unit 240 (FIG. 1). The designating information includes image data of the measuring portion designating image corresponding to the specific portion of the object image S. Hereinafter, the image data of the measuring portion designating image is referred to as designating image data.

Figure 6:
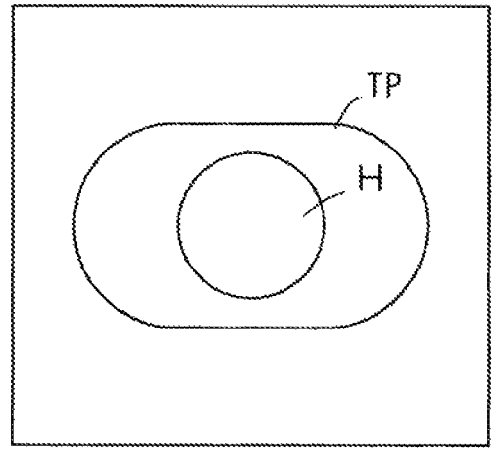
FIG. 6 is a view showing an example of a measuring portion designating image.

FIG. 6 is a view showing an example of the measuring portion designating image. A measuring portion designating image AI of FIG. 6 is an image of one terminal part TP of the measuring object S. In the present example, a portion representing each terminal part TP of the measuring object S in the object image OI corresponds to a specific portion of the object image OI. The measuring portion designating image AI may be a specific portion of an image of the measuring object S to be actually measured, or may be a specific portion of an image of the measuring object S of the same kind.

Figure 7:
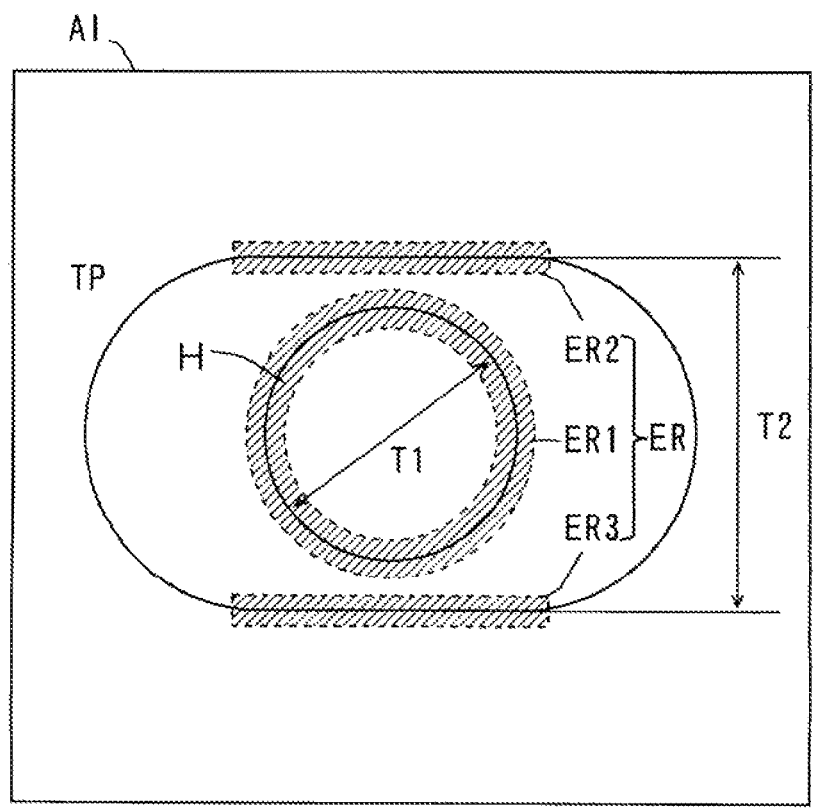
FIG. 7 is a view showing examples of a measuring condition and an edge detecting region which are set with respect to the measuring portion designating image of FIG. 6.

A measuring condition and an edge detecting region are set with respect to the measuring portion designating image AI. The measuring condition shows a geometrical physical quantity to be measured. The edge detecting region is a region for detecting a predetermined characteristic portion (edge part in the present example) from the object image, and has a fixed positional relation with respect to the measuring portion designating image AI. FIG. 7 is a view showing examples of the measuring condition and the edge detecting region which are set with respect to the measuring portion designating image AI of FIG. 6. In the example of FIG. 7, a diameter T1 of the opening H and a width T2 of the terminal part TP are set as the measuring condition. The diameter T1 and the width T2 are each an example of a length as the geometrical physical quantity. Further, a circular region ER1 with a fixed width along a circular rim of the opening H and long regions ER2, ER3 respectively with fixed widths along a pair of mutually parallel sides of the terminal part TP are set as an edge detecting region ER. The measuring condition and a relative position of the edge detecting region ER with respect to the measuring portion designating image AI are stored into the storage unit 240.

Figure 8:
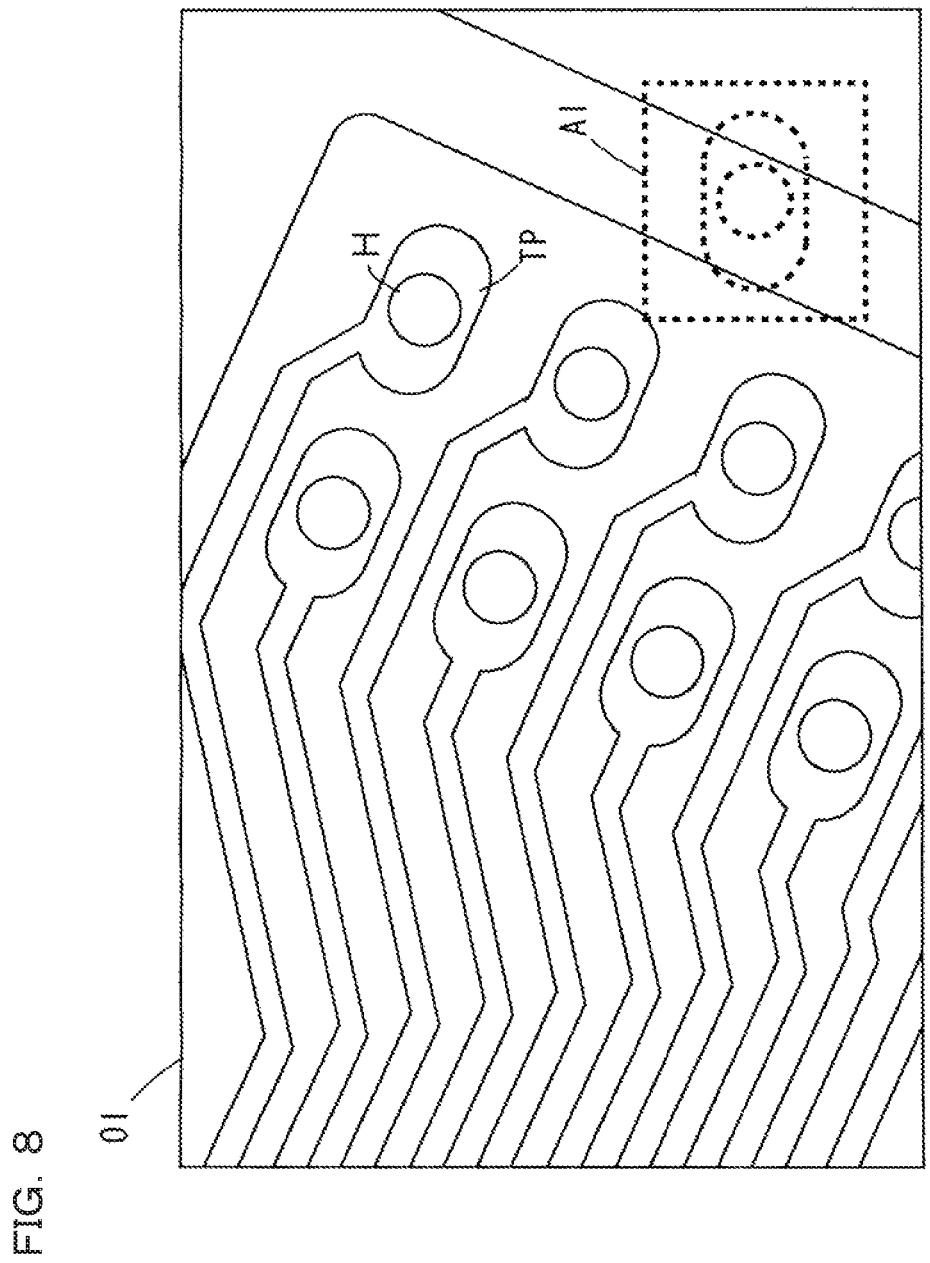
FIG. 8 is a view for describing a method for designating a measuring portion of a measuring object by use of the measuring portion designating image.

FIGS. 8 to 11 are views for describing a method for designating the measuring portion of the measuring object S by use of the measuring portion designating image. At the time of designating the measuring portion, as shown in FIG. 8, the object image OI is displayed in the display part 260 (FIG. 1), and the measuring portion designating image AI is also displayed translucently in the display part 260 so as to be superimposed on the object image OI.

When an imaging magnification at the time of acquiring the object image data is different from an imaging magnification at the time of acquiring the designating image data, the measuring portion designating image AI is enlarged or reduced based on a ratio of these imaging magnifications. It is thereby possible to display the object image OI and the measuring portion designating image AI at the common magnification in the display part 260. It is to be noted that the object image OI may be enlarged or reduced in place of the measuring portion designating image AI being enlarged or reduced.

Figure 9:
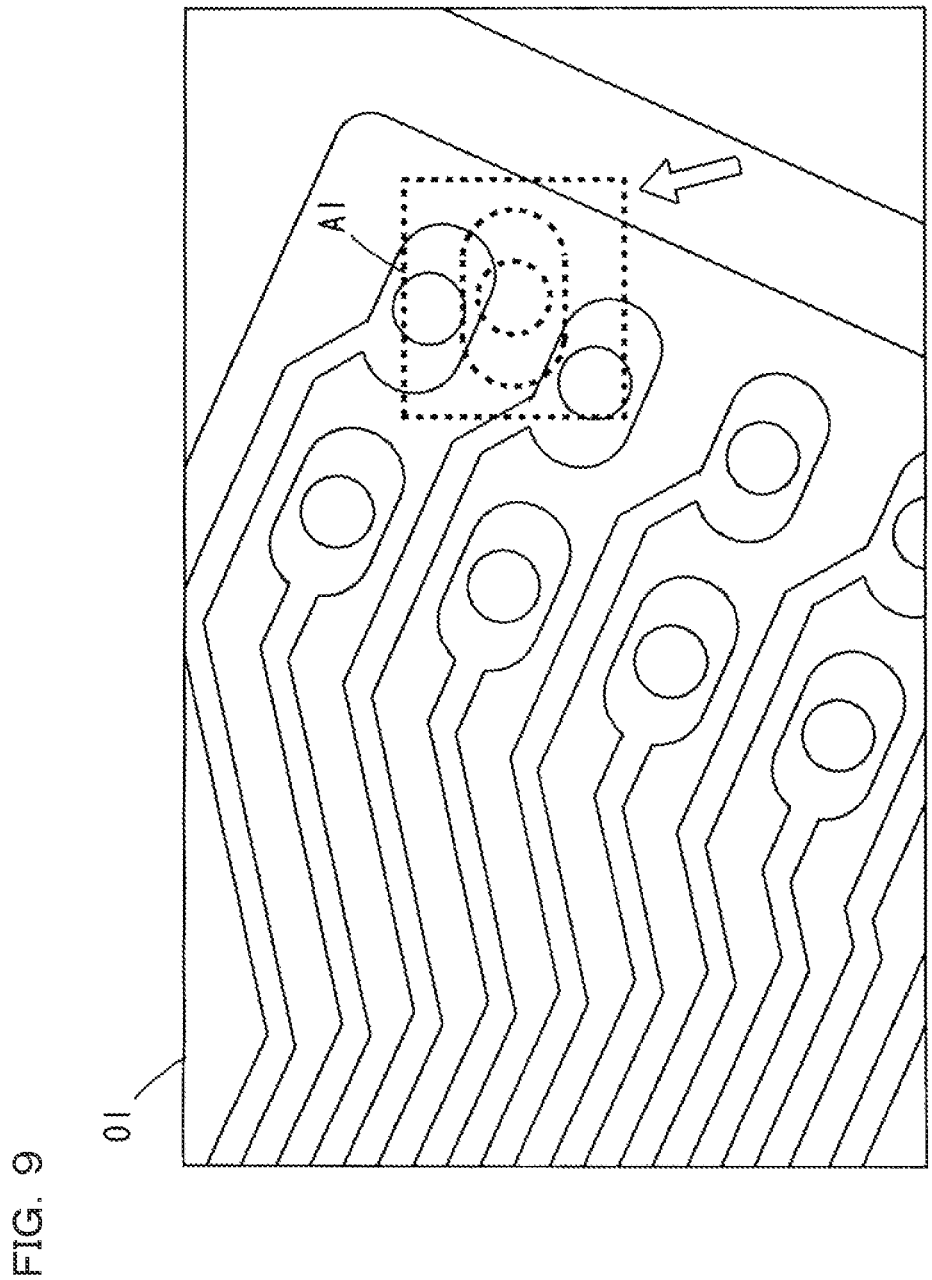
FIG. 9 is a view for describing the method for designating the measuring portion of the measuring object by use of the measuring portion designating image.

By operation of the input unit 250 (FIG. 1) by the user, the measuring portion designating image AI is moved relatively to the object image OI, as shown in FIG. 9. For example, in the case of using a mouse as the input unit 250, the measuring portion designating image AI is dragged, to thereby move the measuring portion designating image AI relatively to the object image OI. Further, for example, a mouse wheel is rotated, to thereby adjust an orientation of the measuring portion designating image AI.

Figure 10:
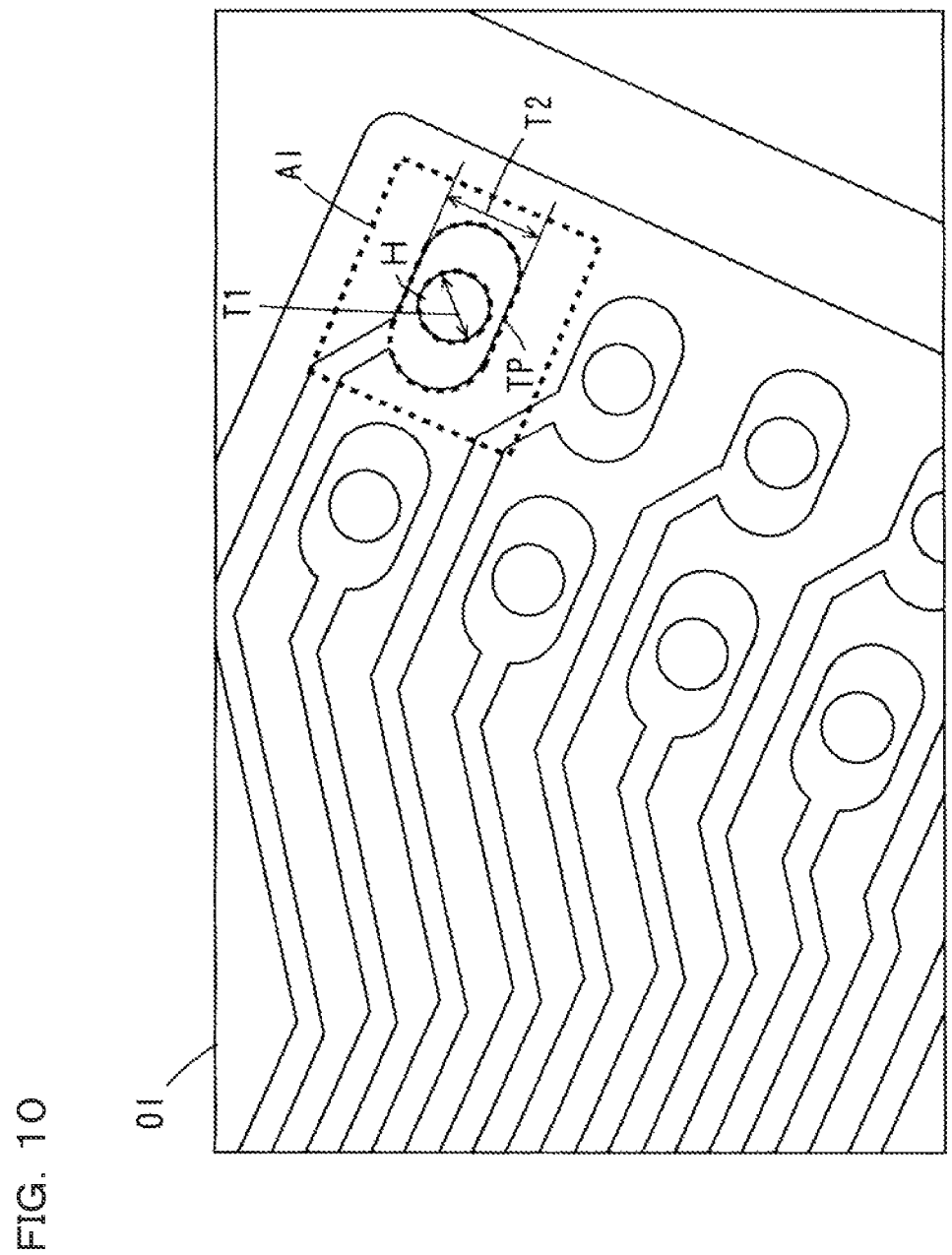
FIG. 10 is a view for describing the method for designating the measuring portion of the measuring object by use of the measuring portion designating image.

As shown in FIG. 10, the user adjusts the position and the orientation of the measuring portion designating image AI by operation of the input unit 250 (FIG. 1) so as to superimpose the measuring portion designating image AI on a desired specific portion of the object image OI. It should be noted that, when a distance between the specific portion of the object image OI and the measuring portion designating image AI falls within a previously set range by operation of the input unit 250 by the user, the position and the orientation of the measuring portion designating image AI may be automatically adjusted such that the measuring portion designating image AI is superimposed on the specific portion of the object image OI.

When the operation of the input unit 250 (e.g. click of the mouse) for designating the measurement is performed in a state where the measuring portion designating image AI is superimposed on the desired specific portion of the object image OI, an edge part of the object image OI is detected from the edge detecting region ER (FIG. 7) corresponding to the measuring portion designating image AI. The edge part is a portion where brightness (luminance, color or the like) abruptly changes, and a portion of the object image OI which represents a boundary of each part of the measuring object S. In this case, a portion of the measuring object S which corresponds to the detected edge part is designated as a measuring portion of the measuring object S. A geometrical physical quantity set as the measuring condition concerning this measuring portion is measured.

Specifically, in the object image OI, an edge part representing the circular rim of the opening H and an edge part representing the pair of sides of the terminal part TP are detected. Based on a diameter T1 and a width T2 of the detected edge parts, an actual diameter T1 of the opening H and an actual width T2 of the terminal part TP are measured. In this case, actual dimensions are calculated from dimensions (the number of pixels) in the object image OI based on the imaging magnification of the object image OI.

Figure 11:
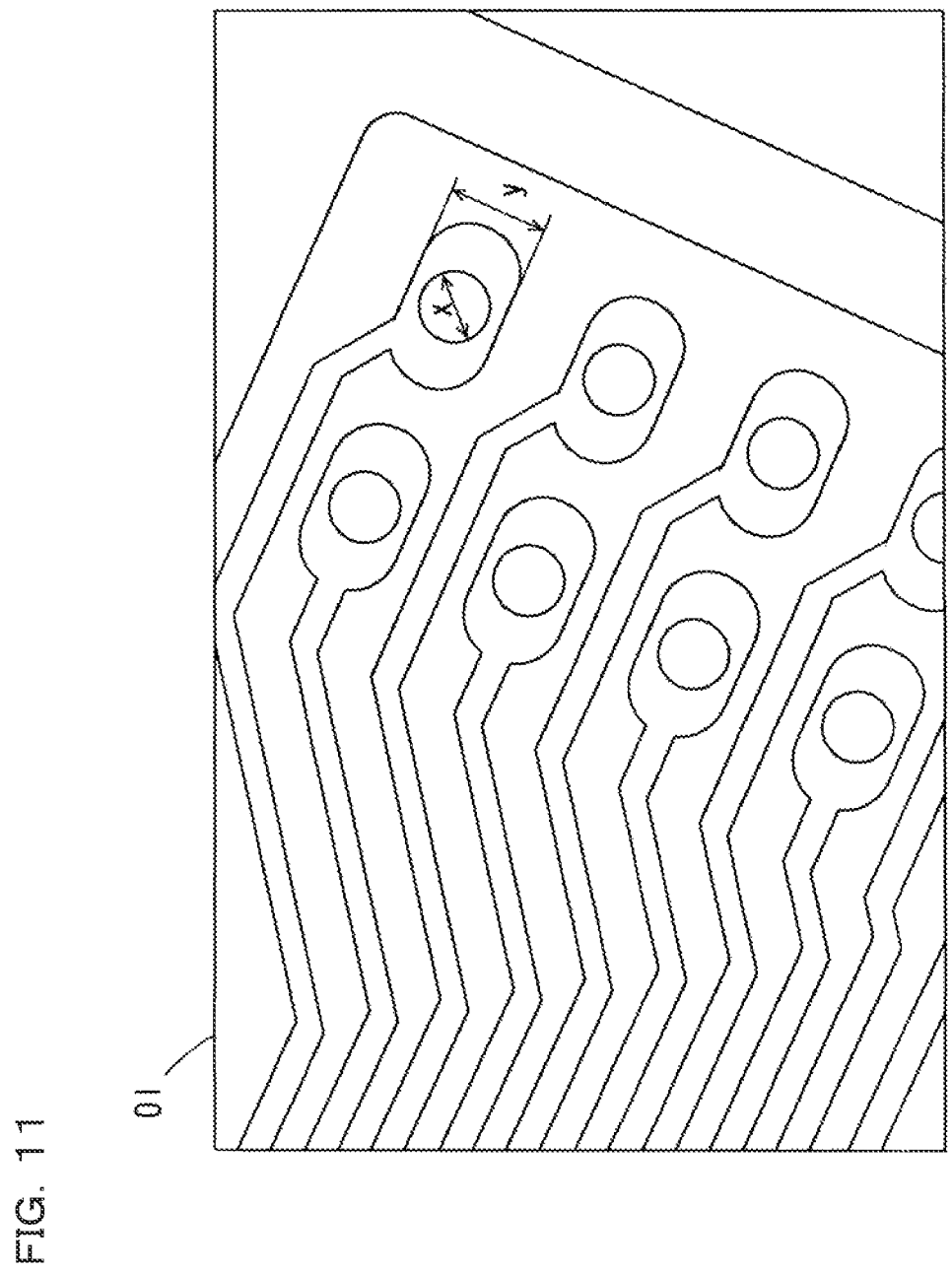
FIG. 11 is a view for describing the method for designating the measuring portion of the measuring object by use of the measuring portion designating image.

Further, as shown in FIG. 11, a measurement result is displayed on the object image OI along with an auxiliary line such as a dimension line. In FIG. 11, symbols "x" and "y" respectively denote numeric values. Displayed positions of the measurement result and the auxiliary line may be previously set as relative positions with respect to the measuring portion designating image AI and stored into the storage unit 240, or may be appropriately adjusted in accordance with the orientation, the size, and the like of the specific portion of the object image OI.

(3) Method for Setting Measuring Portion Designating Image, Measuring Condition, and Edge Detecting Region FIGS. 12A to 14 are views for describing an example of a method for setting the measuring portion designating image AI, the measuring condition, and the edge detecting region ER. In FIGS. 12A to 14, there will be described the method for setting the measuring portion designating image AI, the measuring condition, and the edge detecting region ER shown in FIGS. 6 and 7. Further, in the present example, the measuring portion designating image AI, the measuring condition, and the edge detecting region ER are set using the object image OI of FIG. 5. FIGS. 12A to 14 are partially enlarged views of the object image OI of FIG. 5.

Figure 12A:
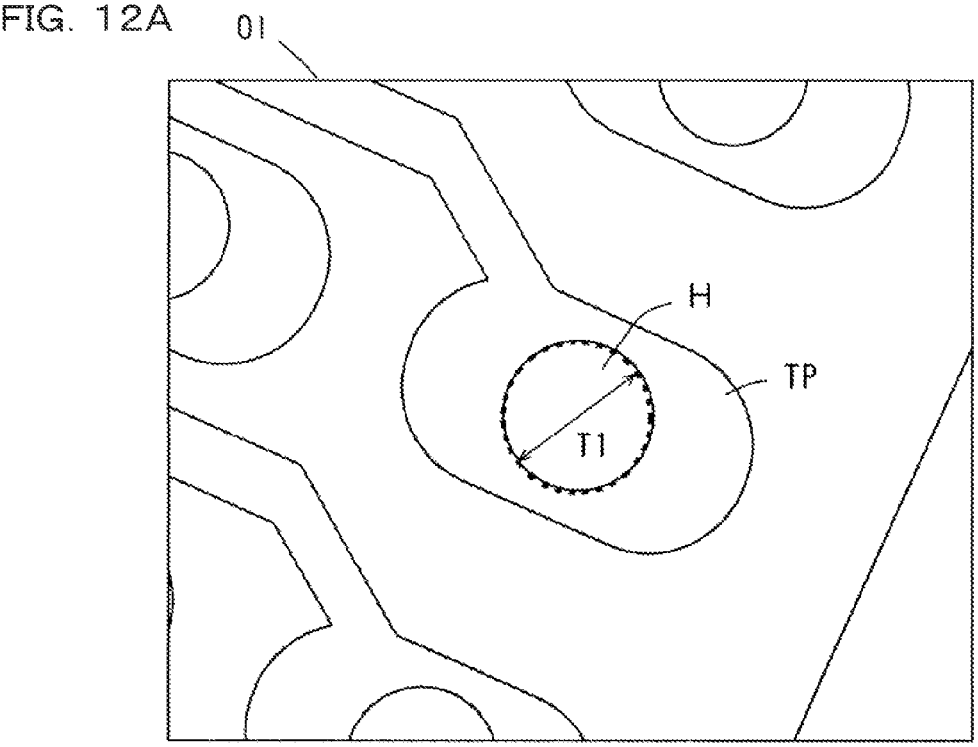
FIGS. 12A and 12B are views for describing an example of a method for setting the measuring portion designating image, the measuring condition, and the edge detecting region.
Figure 12B:
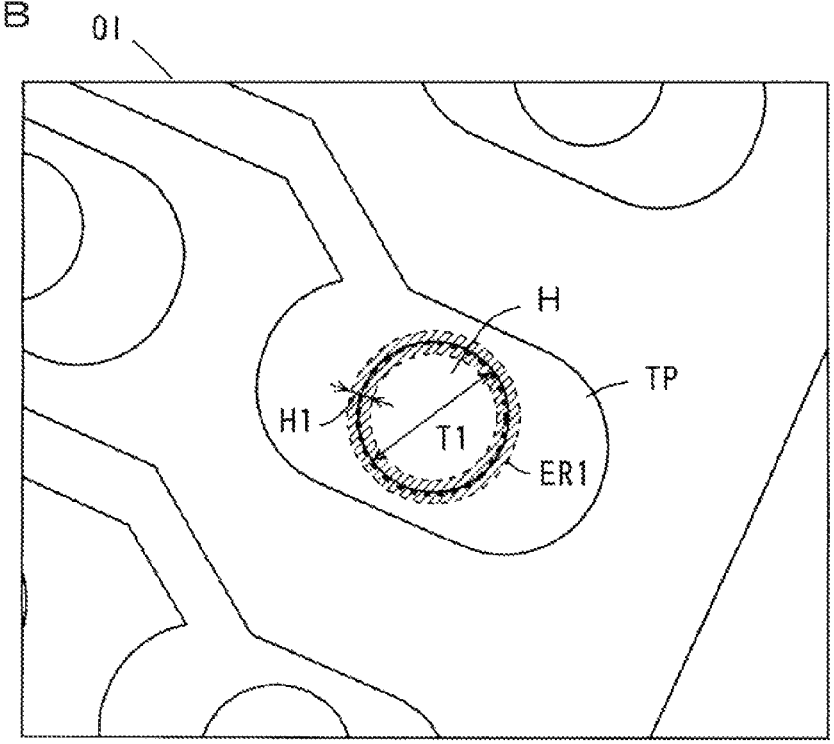

First, as shown in FIG. 12A, the diameter T1 of the opening H is set as the measuring condition on the object image OI. Subsequently, as shown in FIG. 12B, the region ER1 of the edge detecting region ER is set so as to be superimposed on the edge part representing the rim of the opening H of the object image OI. In this case, considering variations in the specific portion of the object image OI, and the like, a width H1 of the region ER1 of the edge detecting region ER is set so as to reliably detect the edge part representing the rim of the opening H.

Figure 13A:
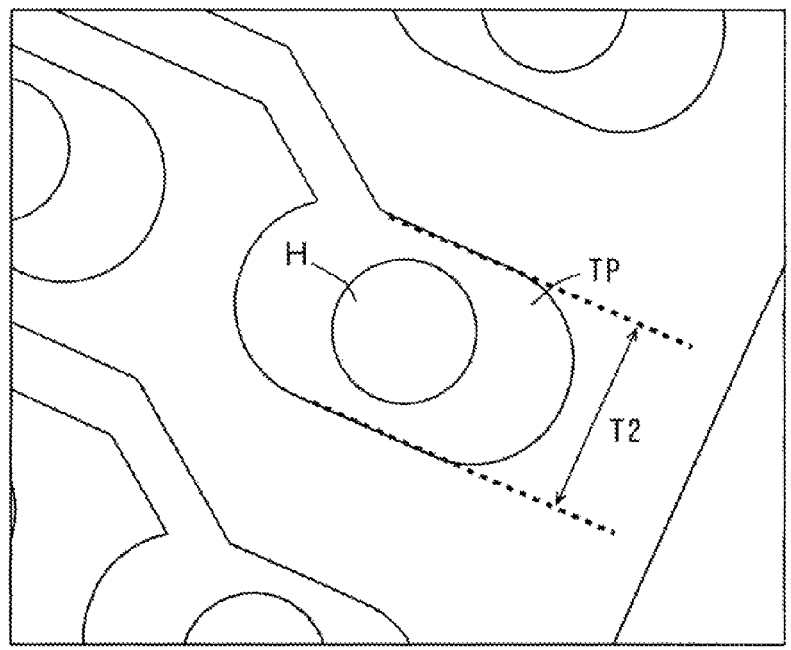
FIGS. 13A and 13B are views for describing an example of the method for setting the measuring portion designating image, the measuring condition, and the edge detecting region.
Figure 13B:
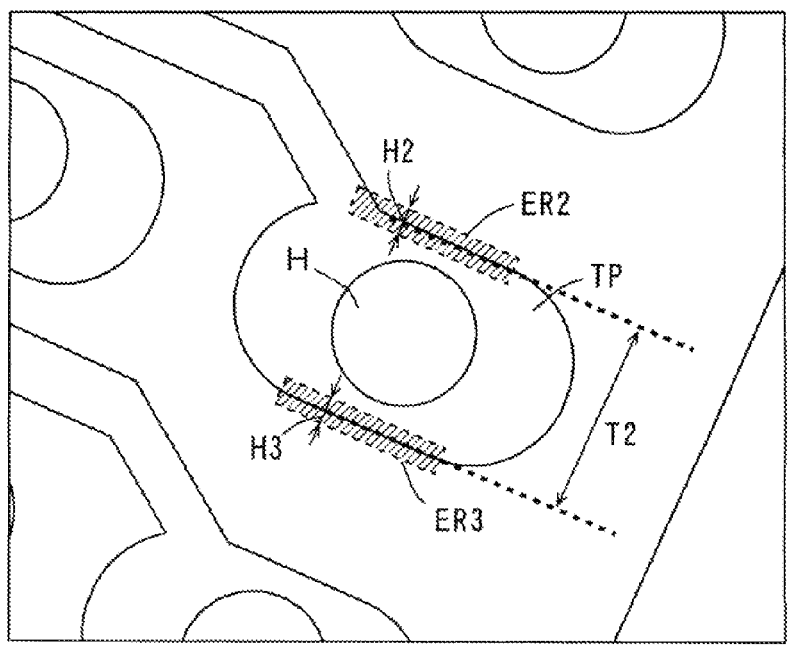

Further, as shown in FIG. 13A, the width T2 of the terminal part TP is set as the measuring condition on the object image OI. Subsequently, as shown in FIG. 13B, regions ER2, ER3 of the edge detecting region ER are set so as to be superimposed on a pair of sides of the terminal part TP of the object image OI. In this case, considering variations in the specific portion of the object image OI and the like, widths H2, H3 of the regions ER2, ER3 of the edge detecting region ER are set such that the edge parts representing the pair of sides of the terminal part TP are reliably detected.

Figure 14:
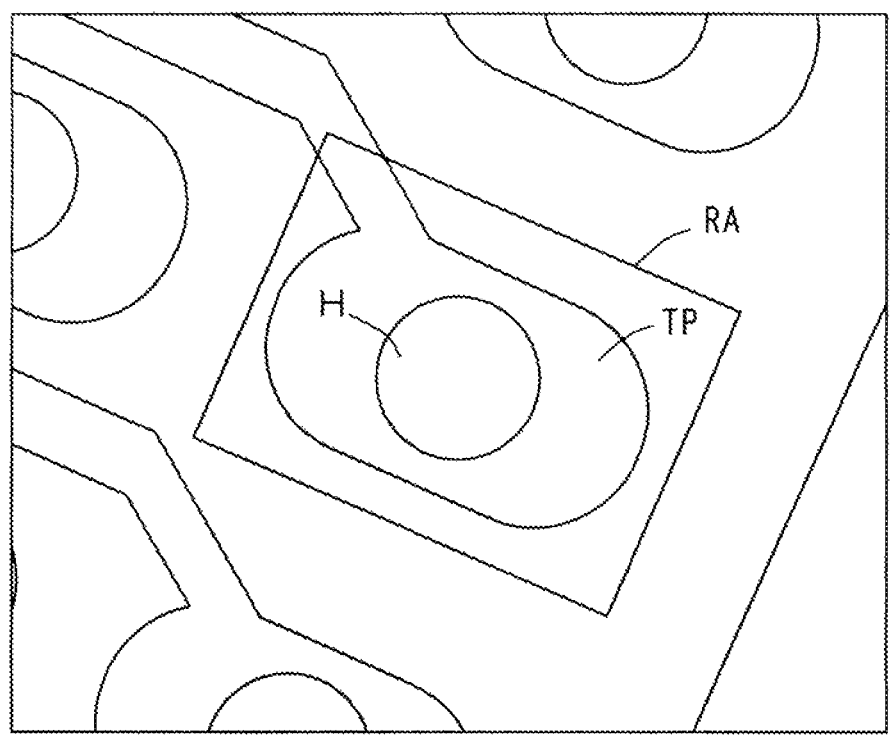
FIG. 14 is a view for describing an example of the method for setting the measuring portion designating image, the measuring condition, and the edge detecting region.

Finally, as shown in FIG. 14, a range RA of the measuring portion designating image AI is set. In this case, a portion within the range RA in the object image OI is set in the measuring portion designating image AI.

The image data of the measuring portion designating image AI, the measuring condition, and the edge detecting region ER, which are set as described above, are stored as designating information into the storage unit 240. In this case, the measuring conditions and the relative position of the edge detecting region ER with respect to the measuring portion designating image AI are stored into the storage unit 240.

(4) Designating Information Setting Process

Figure 15:
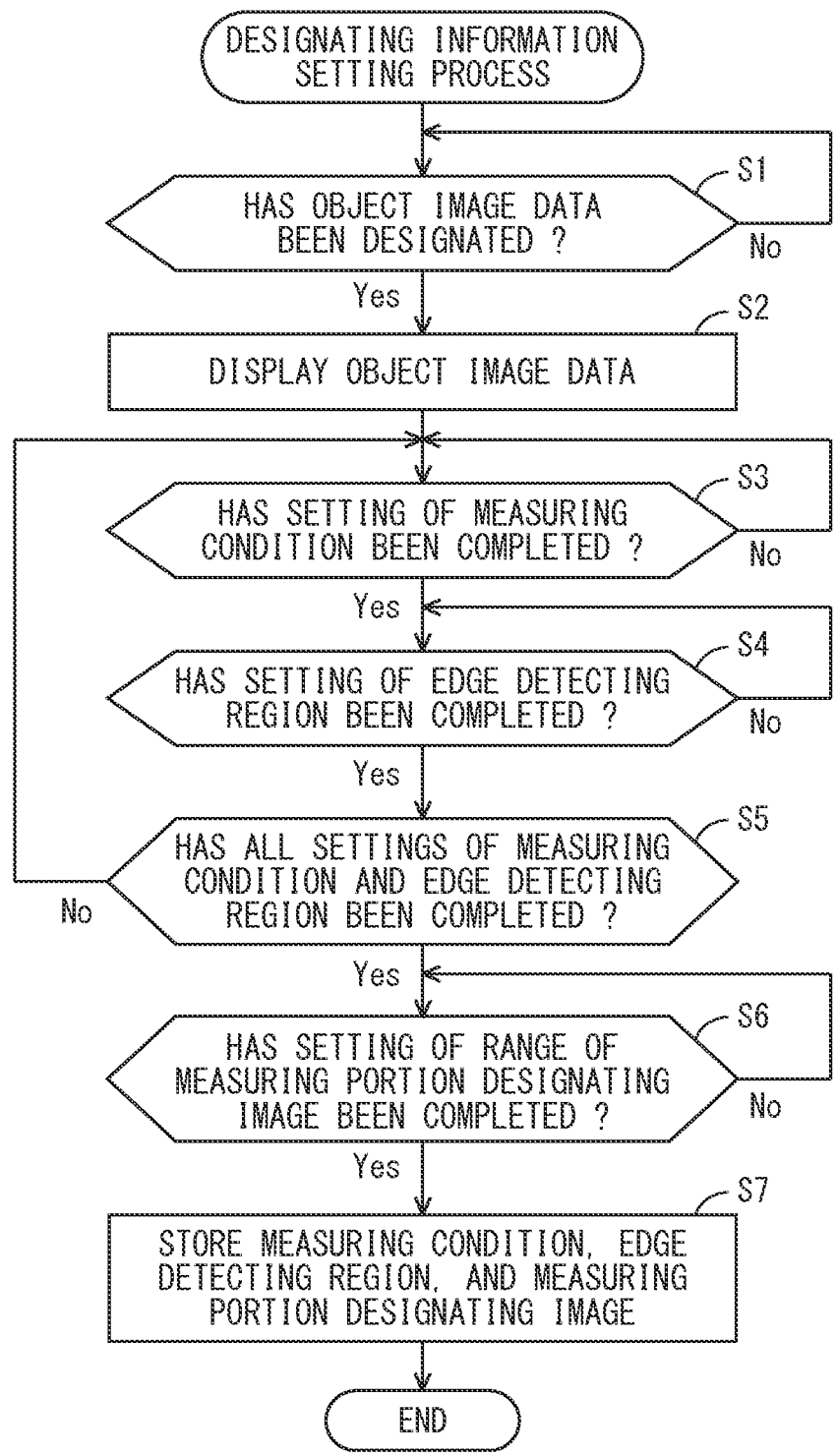
FIG. 15 is a flowchart of a designating information setting process.

A designating information setting process for setting designating information will be described. The designating information setting process is performed by the CPU 220 of FIG. 1 executing a designating information setting process program stored in the storage unit 240. FIG. 15 is a flowchart of a designating information setting process.

As shown in FIG. 15, first, the CPU 220 determines whether or not object image data which is used for setting the designating information has been designated by the user (step S1). For example, by operation of the input unit 250 (FIG. 1), the user designates desired object image data out of the object image data stored in the storage unit 240 (FIG. 1) and the object image data acquired by the imaging unit 10 at that time.

When the object image data has not been designated, the CPU 220 repeats the process of step S1 until the object image data is designated. When the object image data has been designated, the CPU 220 displays the object image OI in the display part 260 based on the designated object image data (step S2).

In a state where the object image OI is displayed in the display part 260, the user sets the measuring conditions, the edge detecting region ER, and the range of the measuring portion designating image AI by operation of the input unit 250, as shown in FIGS. 12A to 14. Upon completion of respective settings of the measuring conditions, the edge detecting region ER, and the range of the measuring portion designating image AI, the user performs a predetermined operation (e.g. double click or the like) of the input unit 250. Further, when all the settings of the measuring conditions and the edge detecting region ER have been completed, the user, for example, selects a complete button displayed in the display part 260 by operation of the input unit 250.

The CPU 220 determines whether or not the setting of the measuring condition has been completed based on the operation of the input unit 250 (step S3). When the setting of the measuring condition has not been completed, the CPU 220 repeats the process of step S3 until the setting of the measuring condition is completed. When the setting of the measuring condition has been completed, the CPU 220 determines whether or not the setting of the edge detecting region ER has been completed based on the operation of the input unit 250 (step S4). When the setting of the edge detecting region ER has not been completed, the CPU 220 repeats the process of step S4 until the setting of the edge detecting region ER is completed. When the setting of the edge detecting region ER has been completed, the CPU 220 determines whether or not all the settings of the measuring condition and the edge detecting region ER have been completed based on the operation of the input unit 250 (step S5).

When all the settings of the measuring condition and the edge detecting region ER have not been completed, the CPU 220 returns to the process of step S3. When all the settings of the measuring condition and the edge detecting region ER have been completed, the CPU 220 determines whether or not the setting of the measuring portion designating image AI has been completed based on the operation of the input unit 250 (step S6). When the setting of the range of the measuring portion designating image AI has not been completed, the CPU 220 repeats the process of step S6. When the setting of the range of the measuring portion designating image AI has been completed, the CPU 220 stores image data of the set measuring portion designating image AI into the storage unit 240, and stores the measuring condition and the relative position of the edge detecting region ER with respect to the measuring portion designating image AI into the storage unit 240 (step S7).

(5) Measuring Process

Figure 16:
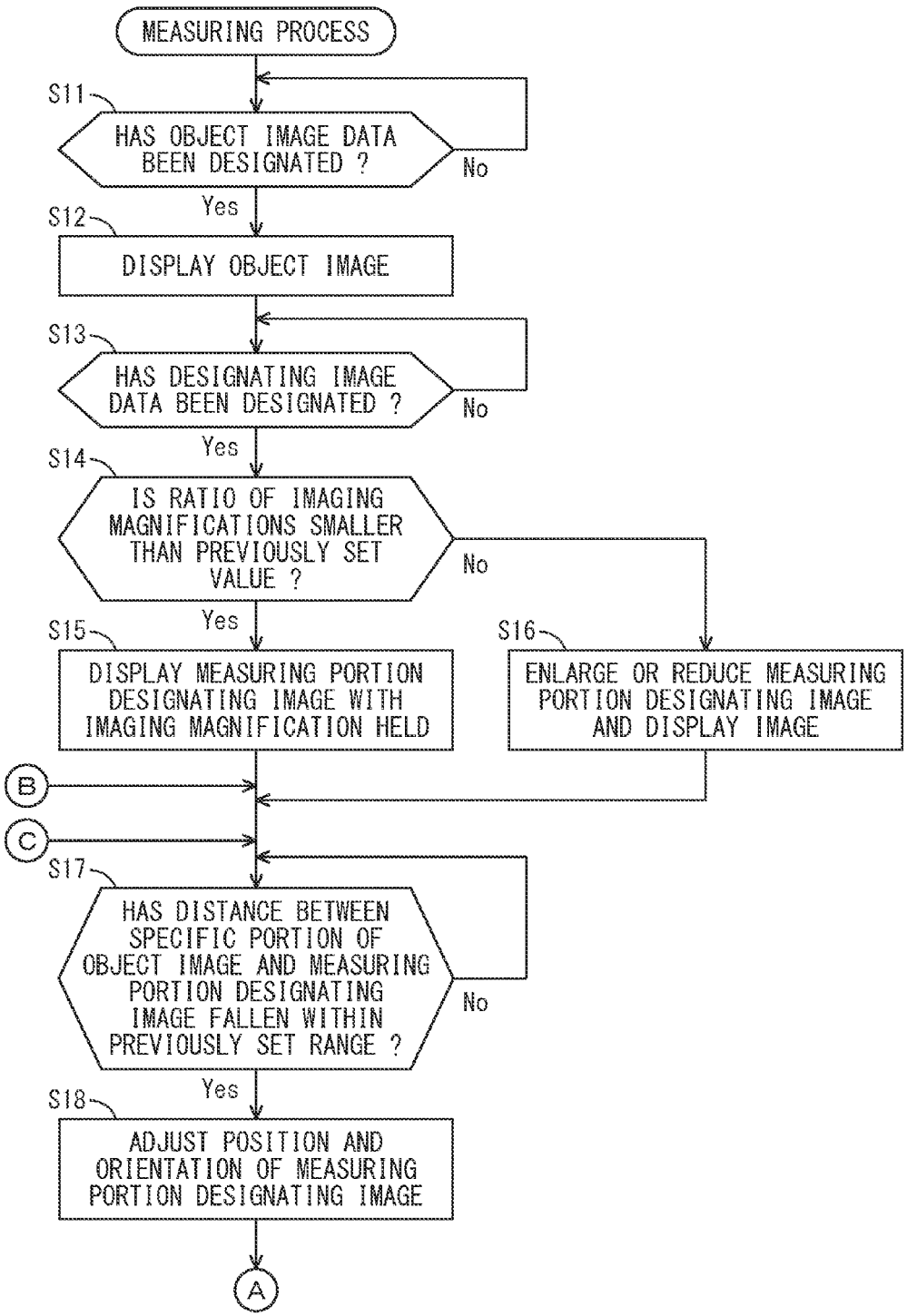
FIG. 16 is a flowchart of a measuring process.
Figure 17:
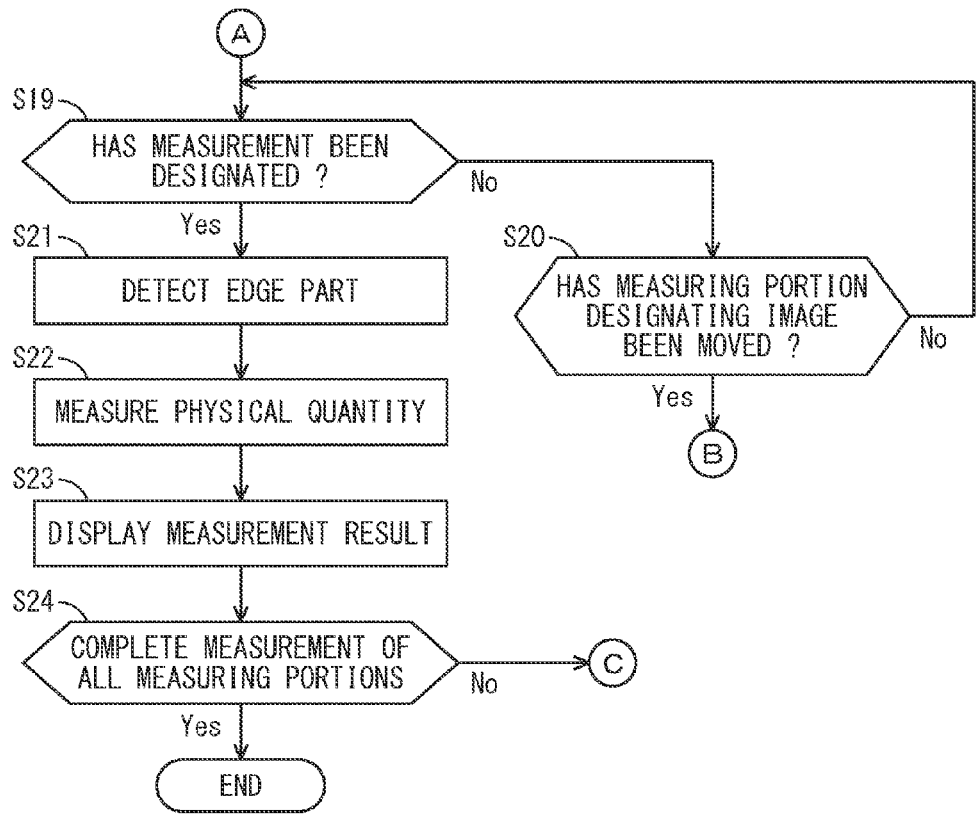
FIG. 17 is a flowchart of the measuring process.

A measuring process for measuring a physical quantity of a measuring portion of the measuring object S will be described. The designating information setting process is performed by the CPU 220 of FIG. 1 executing a measuring process program stored in the storage unit 240. FIGS. 16 and 17 are flowcharts of the measuring process.

As shown in FIG. 16, first, the CPU 220 determines whether or not the object image data has been designated (step S11). For example, by operation of the input unit 250 (FIG. 1), the user designates desired object image data out of the object image data stored in the storage unit 240 (FIG. 1) and the object image data acquired by the imaging unit 10 at that time. The object image data used for the measuring process may be the same as or different from the object image data used for the above designating information setting process.

When the object image data has not been designated, the CPU 220 repeats the process of step S11 until the object image data is designated. When the object image data has been designated, the CPU 220 displays the object image OI in the display part 260 based on the designated object image data (step S12).

Next, the CPU 220 determines whether or not the designating image data has been determined (step S13). By operation of the input unit 250, the user designates desired designating image data from one or a plurality of pieces of designating image data stored as designating information in the storage unit 240.

When the designating image data has not been designated, the CPU 220 repeats the process of step S13 until the designating image data is designated. When the designating image data has been designated, the CPU 220 determines whether or not a ratio between an imaging magnification of the object image data designated in step S11 and an imaging magnification of the designating image data designated in step S13 is smaller than a previously set value (step S14).

When the ratio between the imaging magnification of the object image data and the imaging magnification of the designating image data is smaller than the previously set value, the CPU 220 displays the measuring portion designating image AI, with the imaging magnification held, in the display part 260 based on the object image data (step S15). When the ratio between the imaging magnification of the object image data and the imaging magnification of the designating image data is not smaller than the previously set value, the CPU 220 enlarges or reduces the measuring portion designating image AI and displays the image in the display part 260 such that a display magnification of the object image OI is the same as a display magnification of the measuring portion designating image AI based on the ratio between the imaging magnification of the object image data and the imaging magnification of the designating image data (step S16).

In a state where the object image OI and the measuring portion designating image AI are displayed in the display part 260, the user moves the measuring portion designating image AI by operation of the input unit 250, as shown in FIGS. 8 to 10.

The CPU 220 determines whether or not a distance between the specific portion of the object image OI (portion representing the terminal part TP) and the measuring portion designating image AI has fallen within a previously set range (step S17). The specific portion of the object image OI (portion representing the terminal part TP) is detected based on the measuring portion designating image AI by, for example, pattern matching. When the distance between the specific portion of the object image OI and the measuring portion designating image AI has not fallen within the previously set range, the CPU 220 repeats the process of step S17.

When the distance between the specific portion of the object image OI and the measuring portion designating image AI falls within the previously set range, the CPU 220 adjusts the position and the orientation of the measuring portion designating image AI such that the measuring portion designating image AI is superimposed on the specific portion of the object image OI (step S18).

Next, the CPU 220 determines whether or not measurement has been designated based on the operation of the input unit 250 (e.g. click of the mouse) (step S19). When the measurement has not been designated, the CPU 220 determines whether or not the measuring portion designating image AI has been moved after adjustment of the position and the orientation of the measuring portion designating image AI in step S18 (step S20). When the measuring portion designating image AI has not been moved, the CPU 220 repeats the processes of steps S19, S20. When the measuring portion designating image AI has been moved, the CPU 220 returns to the process of step S17.

When the measurement has been designated, the CPU 220 detects the edge part of the object image OI based on the measuring condition and the edge detecting region ER stored as the designating information in the storage unit 240 (step S21), and measures the physical quantity of the measuring portion of the measuring object S which corresponds to the detected edge part (step S22). Next, the CPU 220 displays the measurement result in the display part 260 (step S23).

Subsequently, the CPU 220 determines whether or not the measurement of all measuring portions to be measured has been completed (step S24). When all the settings of the measuring conditions and the edge detecting region ER have been completed, the user, for example, selects a complete button displayed in the display part 260 by operation of the input unit 250. When the measurement of all measuring portions to be measured has not been completed, the CPU 220 repeats the processes of steps S17 to S23. When the measurement of all measuring portions to be measured has been completed, the CPU 220 completes the measuring process.

(6) Effects

In the image processing apparatus 200 according to the present embodiment, the object image OI is displayed in the display part 260 based on the object image data, and the measuring portion designating image AI corresponding to the specific portion of the object image OI is displayed in the display part 260 based on the designating image data. By the input unit 250 being operated by the user, the measuring portion designating image AI is moved relatively to the object image OI. When the measuring portion designating image AI is moved to the specific portion of the object image OI, the measuring portion of the measuring object S is designated based on the previously set measuring condition and edge detecting region, to measure the geometrical physical quantity of the designated measuring portion.

Thereby, when a plurality of specific portions are present in the object image OI, the geometrical physical quantity is measured concerning the specific portion where the measuring portion designating image AI has been moved out of the plurality of specific portions. For this reason, the user can move the measuring portion designating image AI to the desired specific portion of the object image OI by operation of the input unit 250, to thereby selectively and readily acquire the geometrical physical quantity of the measuring portion of the measuring object S which corresponds to that specific portion.

Further, in the present embodiment, the measuring portion designating image AI is made of the specific portion of the object image S. Hence, the user can readily recognize the relation between the measuring portion designating image AI and the specific portion of the object image OI. This allows the user to readily move the measuring portion designating image AI to the desired specific portion of the object image OI.

Further, in the present embodiment, when the ratio between the imaging magnification of the object image data and the imaging magnification of the designating image data is not smaller than the previously set value, the measuring portion designating image AI is enlarged or reduced and displayed in the display part 260 such that the display magnification of the object image OI is the same as the display magnification of the measuring portion designating image AI based on the above ratio. This allows the user to more readily move the measuring portion designating image AI to the desired specific portion of the object image OI.

Moreover, in the present embodiment, when the distance between the specific portion of the object image OI and the measuring portion designating image AI falls within the previously set range, the position and the orientation of the measuring portion designating image AI are adjusted such that the measuring portion designating image AI is superimposed on the specific portion of the object image OI. Hence, it is possible to readily and accurately make the measuring portion designating image AI agree with the specific portion of the object image OI. It is thereby possible to readily and accurately acquire the geometrical physical quantity of the measuring portion of the measuring object S which corresponds to the specific portion.

(7) Other Embodiments (7-1)

When the object image data used for the designating information setting process is acquired and thereafter the object image data used for the measuring process is acquired, the CPU 220 may control the imaging unit 10 such that the object image data for the measuring process is acquired on the common imaging condition with the condition at the time of acquiring the object image data for the designating information setting process. In this case, in the measuring process, the correlation between the measuring portion designating image AI and the specific portion of the object image OI becomes higher. Thereby, the user can more readily move the measuring portion designating image AI to the desired specific portion of the object image OI.

(7-2)

Figure 18:
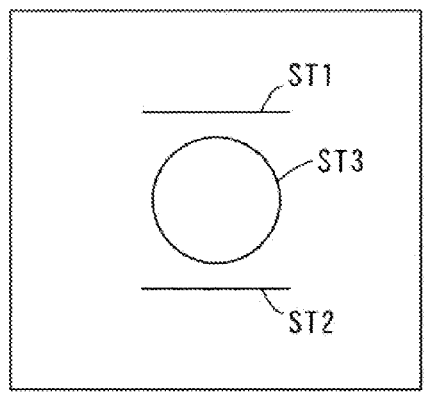
FIG. 18 is a view showing another example of the measuring portion designating image.

Although the measuring portion designating image AI is made up of the specific portion of the object image OI in the above embodiment, this is not restrictive. FIG. 18 is a view showing another example of the measuring portion designating image AI. The measuring portion designating image AI of FIG. 18 includes lines ST1, ST2 representing a pair of sides of the terminal part TP and a line ST3 representing the rim of the opening H. As thus described, the measuring portion designating image AI may be a diagram corresponding to the specific portion of the object image OI.

Also in this case, similarly to the above, a measuring condition and an edge detecting region are set with respect to the measuring portion designating image AI. The measuring portion designating image AI is moved to the specific portion of the object image OI at the time of the measuring process, and the measuring portion of the measuring object S is thereby designated based on the previously set measuring condition and edge detecting region, to measure a geometrical physical quantity of the designated measuring portion.

(7-3)

Although the geometrical physical quantity is measured concerning the edge part detected in the edge detecting region ER in the above embodiment, this is not restrictive. For example, in place of the edge detecting region ER, a detecting region for detecting a predetermined characteristic portion from the object image OI may be set so as to have a fixed positional relation with respect to the measuring portion designating image AI and a geometrical physical quantity may be measured concerning a portion detected in the detecting region. It is to be noted that the predetermined characteristic portion is, for example, a portion having a predetermined geometrical shape, a portion having a luminance in a predetermined range, or the like.

(7-4)

Although the diameter and the width are measured as the geometrical physical quantity in the above embodiment, this is not restrictive, and a radius, a distance, and the like may be measured as the geometrical physical quantity. Further, although these are examples of the length as the geometrical physical quantity, this is not restrictive, and an angle and the like may be measured as the geometrical physical quantity.

(7-5)

Although the measuring portion designating image AI is moved on the display part 260 by operation of the input unit 250 at the time of the measuring process in the above embodiment, this is not restrictive, and the object image OI may be moved on the display part 260 such that the measuring portion designating image AI is moved relatively to the object image OI.

(8) Corresponding Relations Between Each Constitutional Element of Claims and Each Part of Embodiments Although an example of correspondence between each constitutional element of the claims and each part of the embodiments will be hereinafter described, the present invention is not limited to the following example.

In the above embodiment, the object image data is an example of the first image data, the designating image data is an example of the second image data, the object image OI is an example of the object image, the measuring portion designating image AI is an example of the measuring portion designating image, the display part 260 is an example of the display part, the input unit 250 is an example of the operation part, the CPU 220 is an example of the process part and the process unit, and the imaging unit 10 is an example of the imaging unit.

As each constitutional element of the claims, a variety of other elements having the configuration or the function described in the claims can be employed.

The present invention is effectively applicable to a variety of image processing apparatuses.

What is claimed is:

1. An image processing apparatus for a magnification observation apparatus including an object lens, and an imaging device optically coupled to the object lens, and configured to acquire an image representing an object to be measured as an object image, comprising:
   a display configured to display the object image, and to display, on the object image, a measuring portion designating image corresponding to a specific portion the object image;
   a storage configured to store a preset positional relation between the measuring portion designating image and a plurality of detecting regions at which a predetermined characteristic portion including an edge part is detected from the object image, and to store a measuring condition; and
   a processor configured to perform a manual movement of a position of the measuring portion designating image relatively to the object image in response to a manual input, to detect the edge part as the predetermined characteristic portion at each of the plurality of detecting regions from the object image based on the position of the measuring portion designating image relatively to the specific portion of the object image, and to calculate a geometrical physical quantity based on the measuring condition and the edge part detected as the predetermined characteristic portion and wherein the process part is operated so that, when a distance between the measuring portion designating image and the specific portion of the object image falls within a predetermined range by operation of the operation part, the measuring portion designating image is moved so as to make a position of the measuring portion designating image agree with a position of the specific portion of the object image.

2. The image processing apparatus according to claim 1, wherein the geometrical physical quantity includes at least one of a length and an angle.

3. The image processing apparatus according to claim 1, wherein the measuring portion designating image includes a specific portion of an image of an object which is identical or similar to the object to be measured.

4. The image processing apparatus according to claim 1, wherein the measuring portion designating image includes a diagram corresponding to the specific portion of the object image.

5. The image processing apparatus according to claim 1, wherein the manual movement includes an adjustment of a position and an orientation of the measuring portion designating image.

6. An image processing method for a magnification observation apparatus including object lens, and an imaging device optically coupled to the object lens, comprising:
   acquiring an image representing an object to be measured as an object image by the imaging device;
   storing a preset positional relation between a measuring portion designating image and a plurality of detecting regions at which a predetermined characteristic portion including an edge part is detected from the object image;
   storing a measuring condition;
   displaying the object image;
   displaying, on the object image, the measuring portion designating image corresponding to a specific portion of the object image;
   performing a manual movement of a position of the measuring portion designating image relatively to the object image in response to a manual input;
   detecting the edge part as the predetermined characteristic portion at each of the plurality of detecting regions from the object image based on the position of the measuring portion designating image relatively to the specific portion of the object image; and
   calculating a geometrical physical quantity based on the measuring condition and the edge part detected as the predetermined characteristic portion and when a distance between the measuring portion designating image and the specific portion of the object image falls within a predetermined range by operation of the operation part, the measuring portion designating image is moved so as to make a position of the measuring portion designating image agree with a position of the specific portion of the object image.

* * * * *